(12) United States Patent
Reichman (10) Patent No.: US 8,478,630 B2
(45) Date of Patent: Jul. 2, 2013

(54) SYSTEM AND METHOD FOR ONLINE MARKETING, SCHEDULING AND BOOKING OF SERVICES

(75) Inventor: Dana Reichman, Brooklyn, NY (US)

(73) Assignee: Lifebooker LLC, Brooklyn, NY (US)

( * ) Notice: Subject to any disclaimer, the term of this patent is extended or adjusted under 35 U.S.C. 154(b) by 0 days.

(21) Appl. No.: 13/243,010

(22) Filed: Sep. 23, 2011

(65) Prior Publication Data

US 2012/0004943 A1    Jan. 5, 2012

Related U.S. Application Data

(63) Continuation of application No. 13/098,984, filed on May 2, 2011.

(60) Provisional application No. 61/330,356, filed on May 2, 2010, provisional application No. 61/405,817, filed on Oct. 22, 2010.

(51) Int. Cl.
*G06Q 10/00* (2006.01)
*G06Q 30/00* (2006.01)

(52) U.S. Cl.
USPC ..... 705/7.32; 705/7.29; 705/7.31; 705/14.19; 705/14.23; 705/14.24; 705/14.25

(58) Field of Classification Search
USPC .................. 705/7.29, 7.31, 7.32, 14.1, 14.11, 705/14.13, 14.19, 14.2, 14.23, 14.24, 14.25, 705/14.39
See application file for complete search history.

(56) References Cited

U.S. PATENT DOCUMENTS

| | | | |
|---|---|---|---|
| 5,502,636 A * | 3/1996 | Clarke | 705/7.33 |
| 5,860,067 A | 1/1999 | Onda et al. | |
| 5,877,759 A | 3/1999 | Bauer | |
| 5,877,760 A | 3/1999 | Onda et al. | |
| 5,943,051 A | 8/1999 | Onda et al. | |
| 6,018,343 A | 1/2000 | Wang et al. | |
| 6,278,456 B1 | 8/2001 | Wang et al. | |
| 6,317,722 B1 * | 11/2001 | Jacobi et al. | 705/14.51 |
| 7,328,406 B2 * | 2/2008 | Kalinoski et al. | 705/7.12 |
| 7,483,846 B1 * | 1/2009 | Kumar et al. | 705/26.43 |
| 7,552,393 B2 | 6/2009 | Hayes-Roth | |
| 7,757,176 B2 | 7/2010 | Vakil et al. | |
| 8,060,395 B1 * | 11/2011 | Frasher et al. | 705/7.18 |
| 2002/0004751 A1 * | 1/2002 | Seki et al. | 705/20 |
| 2002/0116348 A1 | 8/2002 | Phillips et al. | |

(Continued)

OTHER PUBLICATIONS

Marketing Weekly News, "Lifebooker: Lifebooker 2.0 Offers Beauty on a Budget During Tight Times," Feb. 14, 2009, Marketing Weekly News, p. 58.*

(Continued)

*Primary Examiner* — Justin M Pats
*Assistant Examiner* — Ivan R Goldberg
(74) *Attorney, Agent, or Firm* — Arent Fox LLP (57) ABSTRACT

Disclosed are systems, methods and computer program products for online marketing, scheduling and booking of service appointments. In one example, the system for scheduling and booking of service appointments includes an inventory database containing schedules of booked and available service appointments associated with a plurality of service providers. The system further includes a calendar-based service provider interface for creating a schedule of services provided by the service provider and storing the schedule in the inventory database. The system further includes a calendar-based service user interface for displaying schedules of available service appointments and booking one or more service appointments.

18 Claims, 10 Drawing Sheets

U.S. PATENT DOCUMENTS

| | | | |
|---|---|---|---|
| 2003/0061087 A1* | 3/2003 | Srimuang | 705/8 |
| 2004/0215517 A1* | 10/2004 | Chen et al. | 705/14 |
| 2005/0234786 A1 | 10/2005 | Aggarwal | |
| 2007/0075136 A1 | 4/2007 | Jacob | |
| 2007/0150354 A1* | 6/2007 | Walker et al. | 705/14 |
| 2007/0156513 A1* | 7/2007 | Mastrianni et al. | 705/14 |
| 2007/0260636 A1* | 11/2007 | Baio et al. | 707/104.1 |
| 2008/0033862 A1* | 2/2008 | Ehsani | 705/37 |
| 2008/0065565 A1* | 3/2008 | Walker et al. | 705/400 |
| 2008/0114647 A1* | 5/2008 | Singer et al. | 705/14 |
| 2008/0126239 A1* | 5/2008 | Banbury et al. | 705/37 |
| 2008/0177826 A1* | 7/2008 | Pitroda | 709/203 |
| 2008/0183868 A1 | 7/2008 | Singh et al. | |
| 2008/0281702 A1* | 11/2008 | Kirkwood | 705/14 |
| 2008/0312962 A1* | 12/2008 | Kirkwood | 705/2 |
| 2009/0125380 A1* | 5/2009 | Otto et al. | 705/10 |
| 2009/0144130 A1 | 6/2009 | Grouf et al. | |
| 2010/0070296 A1 | 3/2010 | Massoumi et al. | |
| 2010/0070297 A1 | 3/2010 | Kharraz Tavakol et al. | |
| 2010/0070303 A1 | 3/2010 | Massoumi et al. | |
| 2010/0094680 A1* | 4/2010 | Ellis et al. | 705/9 |
| 2010/0125490 A1 | 5/2010 | Kiciman et al. | |
| 2010/0191569 A1* | 7/2010 | Ellis et al. | 705/9 |
| 2010/0228564 A1 | 9/2010 | Kharraz Tavakol et al. | |
| 2010/0287103 A1* | 11/2010 | Mason | 705/80 |
| 2011/0093318 A1* | 4/2011 | Guday et al. | 705/14.13 |
| 2011/0153396 A1* | 6/2011 | Marcuvitz et al. | 705/14.2 |
| 2011/0173102 A1* | 7/2011 | Burns et al. | 705/27.2 |
| 2011/0191122 A1 | 8/2011 | Kharraz Tavakol et al. | |
| 2012/0065989 A1 | 3/2012 | Massoumi et al. | |
| 2012/0109679 A1 | 5/2012 | Massoumi et al. | |
| 2012/0284102 A1* | 11/2012 | Shave | 705/14.23 |

OTHER PUBLICATIONS

Lifebooker website, http://www.lifebooker.com, retrieved from Internet Archive, dated Apr. 16, 2008, Feb. 8, 2009, and Apr. 2, 2009.*

Dasgupta, ("Dynamic Consumer Profiling and Tiered Pricing Using Software Agents," 2003, Electronic Commerce Research, vol. 3, pp. 277-296.*

Albrecht, "Accounting: Concepts and Applications," 2008, Thomson South-Western, pp. 289, 293-296, 309, 314, 862.

Baron, "Shelf Space Management When Demand Depends on the Inventory Level," 2010, pp. 1-13, Production and Operations Management Society, published online Dec. 7, 2010.

Wiley, "GAAP 2008: Interpretation and Application of Generally Accepted Accounting Principles," 2007, John Wiley & Sons, pp. 76, 77, 78, 185, 348.

Qu, "Advance Selling and Internet Intermediary—Travel Distribution Strategies in the e-Commerce Age," 2007 ICEC '07, pp. 177-184.

Lifebooker, (Lifebooker website, http://www.lifebooker.com, retrieved from Internet Archive, dated Apr. 16, 2008, Jul. 15, 2008, Feb. 8, 2009, and Apr. 2, 2009.

Bhargava et al., "Stockout Compensation: Joint Inventory and Price Optimization in Electronic Retailing", Informs Journal on Computing, vol. 18, No. 2, Spring 2006, pp. 255-266.

* cited by examiner

SYSTEM AND METHOD FOR ONLINE MARKETING, SCHEDULING AND BOOKING OF SERVICES

CROSS-REFERENCE TO RELATED APPLICATIONS

This application is a continuation of U.S. application Ser. No. 13/098,984 filed May 2, 2011, which claims benefit of priority under 35 U.S.C. 119(e) to Provisional Applications No. 61/330,356 filed on May 2, 2010 and No. 61/405,817 filed on Oct. 22, 2010, all of which are incorporated by reference herein in their entirety.

TECHNICAL FIELD

This present disclosure relates generally to the field of electronic commerce and, more specifically, to systems, methods and computer program products for online marketing, scheduling and booking of services using a calendar-based application.

BACKGROUND

Online calendar applications have traditionally been used to store events, appointments and schedule information, which can be accessed by users from anywhere using computers, smart phones or other networked communication devices. Some calendar applications allow users to share their calendars with friends and relatives who also utilize these applications. Some applications provide event reminders via email or have text messages sent to a user's mobile phone. Other applications provide some customization options, such as customizable background images, calendar views and event reminder options. However, these online calendar applications have very limited business marketing utility. For example, online calendar applications have not been provided by internet publishers to be used by local businesses to discount and market their services to the publisher's consumers.

SUMMARY

Disclosed is a publisher-provided, web-based calendar for discounting, marketing, scheduling and booking services. The system provides customizable calendars that service providers can use to create schedules of available services and discounts, which are fed into a user-accessible online marketplace. System users can search services advertised in the online marketplace and schedule and book appointments with service providers through the online booking system.

In one example embodiment, the system provides advanced discount offers functionality that allows service providers to create real-time discount offers for the advertised services. In one example embodiment, the discount offers can be created by service type, practitioner, date, time or other criteria. In another example embodiment, the system also allows service providers to granularly discount a single service or a group of services. The system also provides several different hierarchical views for creating discount offers; e.g., by practitioner and by service. In another embodiment, discount schedules can be created for a single day or repeat daily or weekly.

The above simplified summary of example embodiments of the invention serves to provide a basic understanding of such embodiments. This summary is not an extensive overview of all contemplated aspects of the invention, and is intended to neither identify key or critical elements of all embodiments nor delineate the scope of any or all embodiments. Its sole purpose is to present some concepts of one or more aspects in a simplified form as a prelude to the more detailed description that follows. To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various aspects of the invention may be employed, and this description is intended to include all such aspects of the invention and their equivalents.

BRIEF DESCRIPTION OF THE DRAWINGS

The accompanying drawings, which are incorporated into and constitute a part of this specification, illustrate one or more example embodiments and, together with the detailed description serve to explain their principles and implementations.

In the drawings.

DETAILED DESCRIPTION OF EXAMPLE EMBODIMENTS

Example embodiments are described herein in the context of systems, methods and computer program products for online marketing, discounting, scheduling and booking of services using a web-based calendar application. Those of ordinary skill in the art will realize that the following description is illustrative only and is not intended to be in any way limiting. Other embodiments will readily suggest themselves to those skilled in the art having the benefit of this disclosure. Reference will now be made in detail to implementations of the example embodiments as illustrated in the accompanying drawings. The same reference indicators will be used to the extent possible throughout the drawings and the following description to refer to the same or like items.

Figure 1:
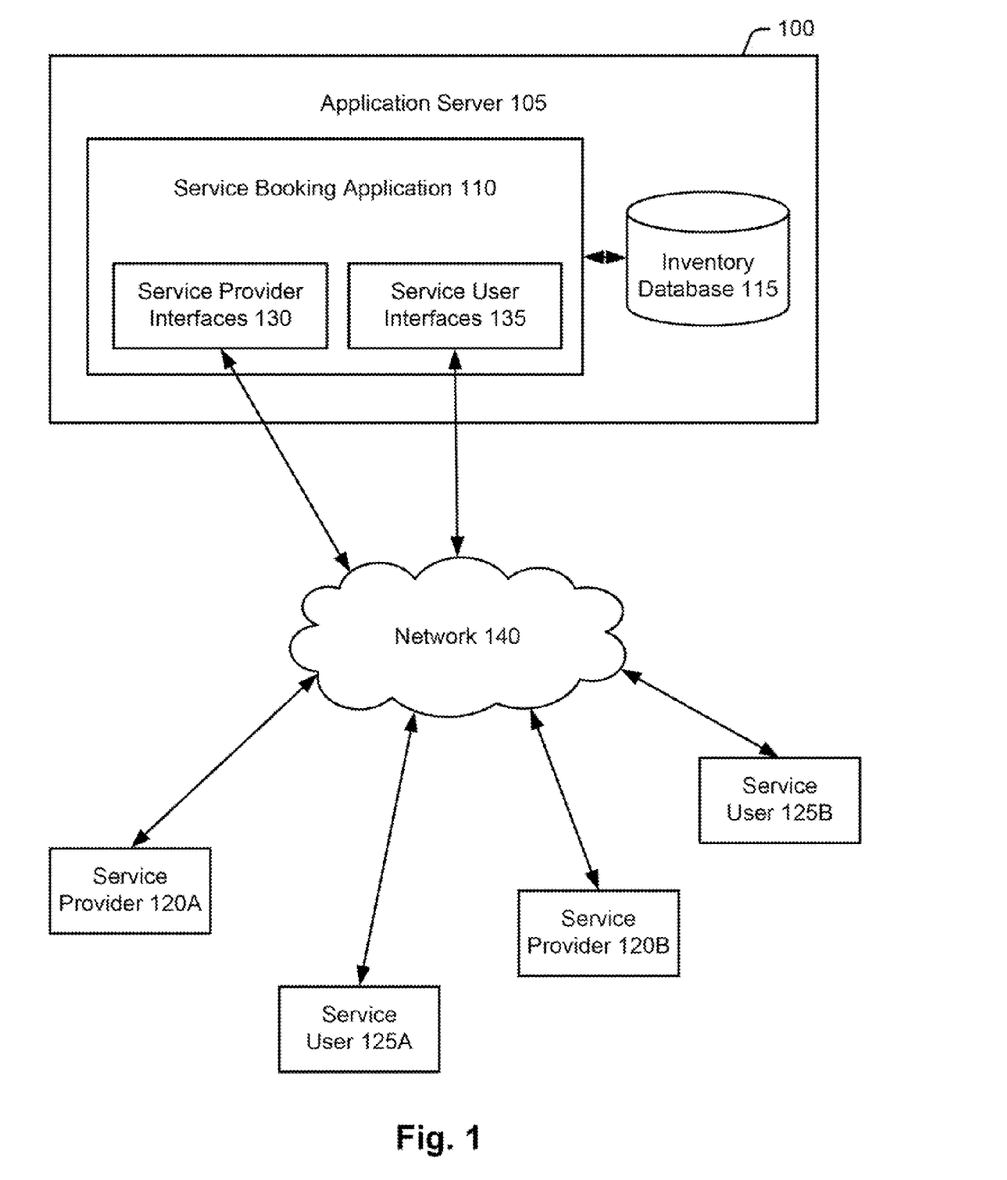
FIG. 1 illustrates one example embodiment of an online service booking system.

FIG. 1 depicts one example embodiment of an online service booking system. As shown, system 100 includes an application server 105 that hosts a service booking application 110 and associated inventory database 115 storing a schedule of booked and available service appointments associated with computers of service providers 120A and 120B and service users 125A and 125B. (Service provider(s) and service user(s) will also be indicated generally by the reference numerals 120 and 125, respectively.) The server 105 is accessible via a network 140 such as the Internet, by computers of service providers 120 and users 125. Service providers 120 may include, but are not limited to, beauty salons, health spas, sports clubs, barber shops and other local businesses (i.e., service providers) that provide services to clients (i.e., service users) with associated appointments. In one example embodiment, system 100 provides a customizable Web-based service provider interface 130 to providers 120 by means of which a provider can create a schedule of available appointments by service, practitioner, date, time or other criteria. In another example embodiment, system 100 provides a Web-based user interface 135 to users 125 for searching availability, discounts, and ratings of available services and booking one or more appointments with service providers 120.

It should be noted that in another embodiment some of the functionality of the booking application 110, including but not limited to, provider and user interfaces 130 and 135, may be implemented as applications directly on the computers of the service providers 120 and service users 125. In this case, the inventory database 115 may be maintained on a remote server hosted by the booking application developer or in the cloud, such as Amazon® Elastic Compute Cloud. It should be also noted that in various embodiments, computers of the service providers 120 and service users 125 may include, but not limited to, personal computers, laptops, netbooks, tablets, digital media players, personal digital assistants, smart phones, or other types of digital devices.

Figure 2:
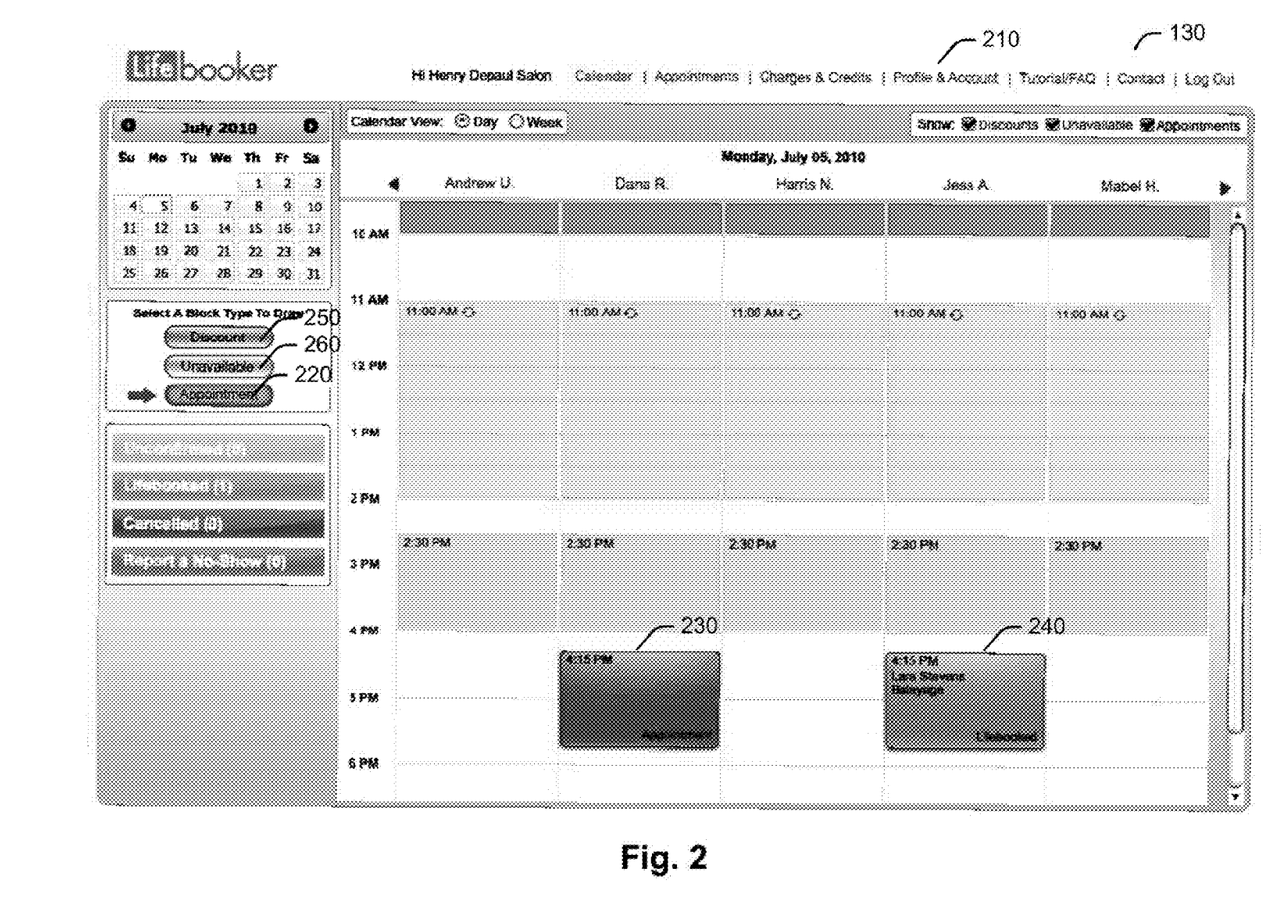
FIG. 2 illustrates one example embodiment of a service provider interface.

FIG. 2 shows an example embodiment of a calendar-based service provider interface 130 of the application 110. Using this interface, service providers 120 can register/access the online booking application 110, create profiles and accounts 210, create/view schedules of appointments 220, enter discount information 250 and perform other functions. The registration/access process may involve creating user name and password, providing contact information, providing service menus, providing billing information and the like. The business profile 210 can be used to enter information about the business in general, about available practitioners, and about the types of available services. The business account may be used to view all information maintained by the booking application 110.

The service provider 120 may also use interface 130 to enter/update/view appointment scheduling information 220. In one example embodiment, service appointments may be made by service users 125 through the service user interfaces 135 and displayed as an appointment block in the appropriate year/month/date/time slot of the calendar-based service provider interface 130. In another example embodiment, the application 110 can interface with third-party scheduling technologies and calendars, such as MindBody Inc., SpaBooker®, Google® Calendar and Microsoft® Outlook®, via dedicated XML APIs to provide business profile information and pull availabilities from those calendars into the service provider interface 130 and to push appointments booked by system users through the application 110. This embodiment exemplifies the publishing functionality of the application as it moves availabilities from a pure calendaring system (i.e. Google® Calendar) into a publisher marketing environment.

As shown in FIG. 2, the calendar-based service provider interface 130 shows a daily operating schedule of Henry Depaul Beauty Salon for Jul. 5, 2010. As shown, there are five (or more) practitioners working on that day, including Andrew U., Dana R., Harris N., Jess A. and Mabel H. They are available for appointments from 10 am to 7 pm. The interface 130 also shows that service providers Dana R. and Jess A. have two scheduled appointments 230 and 240 at 4:15 PM. Dana R. was booked directly through the Salon. Jess A. was booked via the booking application 110. The directly or indirectly booked appointments 230 and 240, respectively, can be designated, for example, using different colors. The appointment blocks 230 and 240 can indicate the names of the users/clients that made these appointments and other information. Since appointment block 230 was made directly through the Salon, and not through the booking application 110, information about this appointment could have been entered manually by the service provider 120 or pulled automatically by the application 110 into the service provider interface 130 from the third-party scheduling system used by the service provider 120. This appointment information may be shown both in the service provider interface 130 and in the service user interface 135, so that service users 125 know which time slots are available for booking and which have already been booked.

In one example embodiment, the service provider 120 can designate time blocks when one or more service providers are unavailable for appointments using "unavailable" tool 260. In the example in FIG. 2, all practitioners have been marked as unavailable from 2:30 PM to 4:00 PM, as shown by the shading. Unavailable blocks can also be pulled automatically by the application 110 into the service provider interface 130 from the third-party scheduling system used by the service provider 120.

In another example embodiment, service provider interface 130 allows service providers 120 to create real-time discounts for their services by practitioner, service, date, time or other criteria. For example, using a discount tool 250, service provider 120 can indicate in the calendar the days and times when service rates of one or more practitioners have been discounted. In the example in FIG. 2, all practitioners have discounted rates on Jul. 5, 2010 from 11 AM to 2 PM, as shown by shading.

Figure 3A:
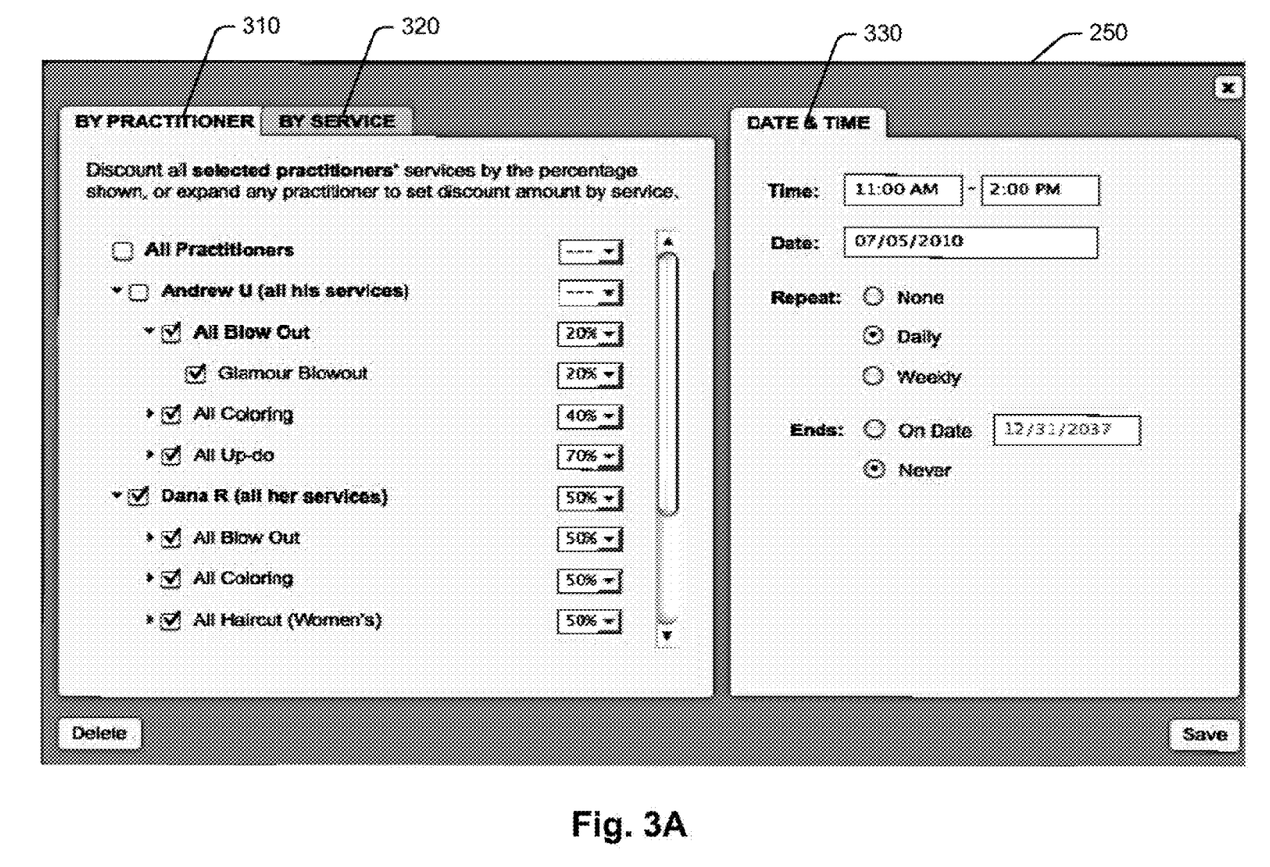
FIGS. 3A and 3B illustrate example embodiments of a discounting tool.

In one example embodiment, the discount tool 250 gives service providers 120 several different options for creating discount offers, such as by practitioner, by service, by date and time. FIG. 3A shows one example interface of the discount tool 250 that can be used for creating different discounts offers for different practitioners 310. As shown, the service provider 120 can set the same discount for all or different discounts for different practitioners. Furthermore, the discount offer may apply to all or specific services provided by each practitioner. For example, in case of Andrew U., a 20% discount is provided on glamour blowout services, and a 40% discount is provided on all coloring and all up-do services, while all services of Dana R. have a 50% discount offer.

Figure 3B:
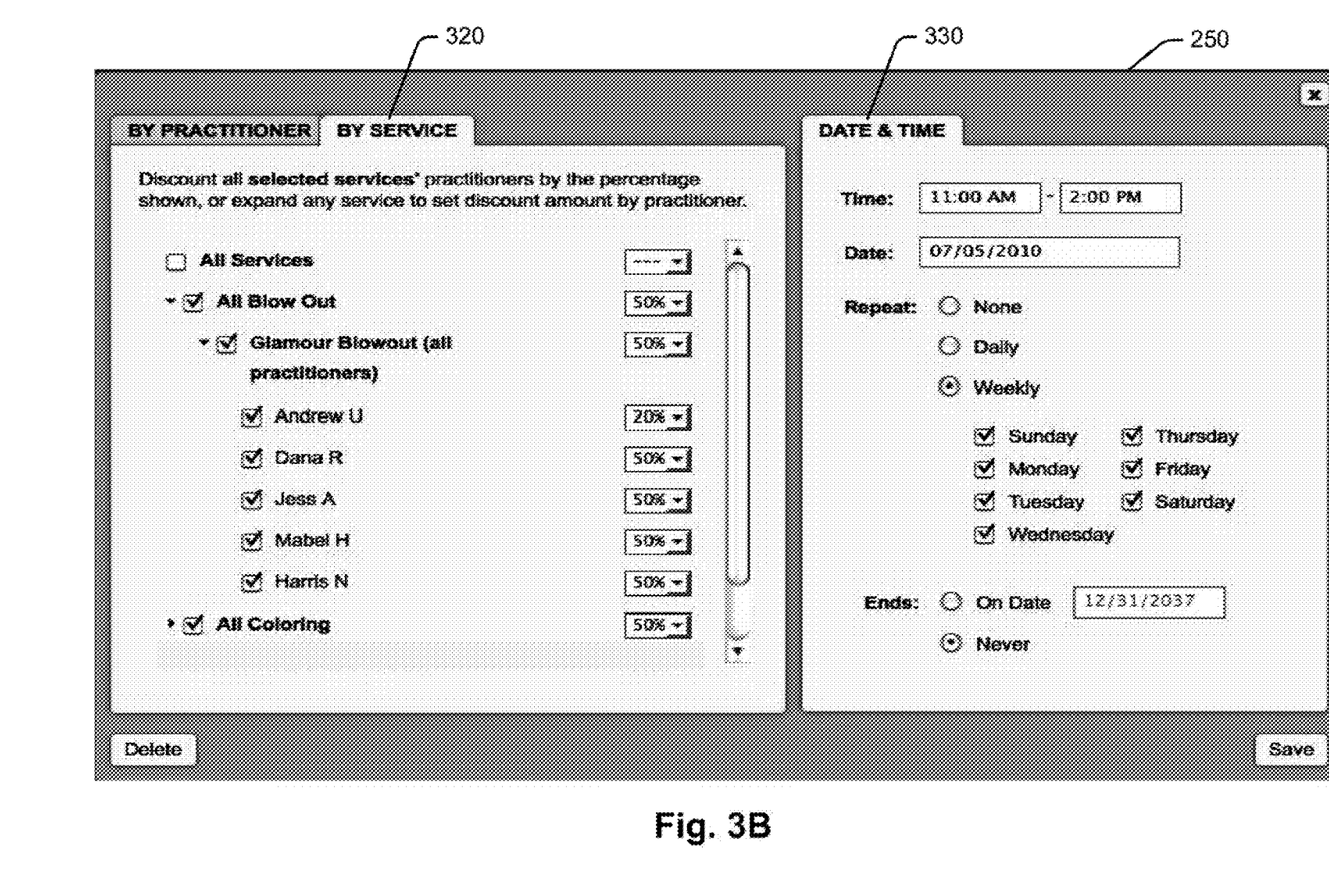

FIG. 3B shows another example interface of the discount tool 250 for creating discount offers for different services 320. As shown, the service provider 120 can set a single discount on all available services, or different discounts on subsets of services, such as all blowout services and all glamour blowout services. Furthermore, for each subcategory of service, the service provider 120 can indicate which practitioners have additional discounts, such as Jess A. has an additional 50% discount on glamour blowout services, while Andrew U. has an additional 20% discount on the same service.

In another example embodiment, the discount tool 250 also allows service providers 120 to specify the appointment date and time 330 when discount offers are made available to the service users. As shown in FIG. 3B, the discounts may be offered, for example, on particular days of the week, on particular dates/times or never end.

Yet in another example embodiment, the discount tool 250 allows service providers 120 to set a function that will automatically discount a single service or a group of services in an effort to maximize revenue to the business. The discount tool 250 can be configured to automatically increase or decrease discounts offered on a particular service or practitioner based on behavioral data and/or by an amount defined by the business (e.g., 10%) in predetermined time increments (e.g., weekly, daily or hourly) for particular blocks of time, to particular groups of users (i.e., users new to the business, in a certain geography, etc.). To that end, the service provider may specify various business decision rules (or use business rules based on behavioral data provided by the booking application 110) that gradually adjust the rate of discount based on lack or excess of bookings of a particular service or practitioner on a particular day or time. For example, a sale on a particular service may start at a high discount, e.g., 80% at 9 AM, when business is generally slow. Then, the discount tool 250 will automatically decrease the rate of discount for an appointment time by, for example, 10% every hour on the hour, until the discount reaches 0% by the end of the day. In an alternative embodiment, a service provider 120 may manually adjust the offered discount without use of the discount tool 250. In addition, during each discount adjustment, the system 100 may advertise the current discount offers to a targeted group of users via email notification, banner ads, SMS text messages, social media, and other forms of advertising and communication platforms.

Once the schedule of available appointments and associated discounts are created by service providers 120 using interface 130, this information is stored in the account of the service provider 120 and fed into a common online marketplace of all available services and providers hosted by the booking application 110. This online marketplace is accessible to service users 125 via service user interfaces 135.

Figure 4:
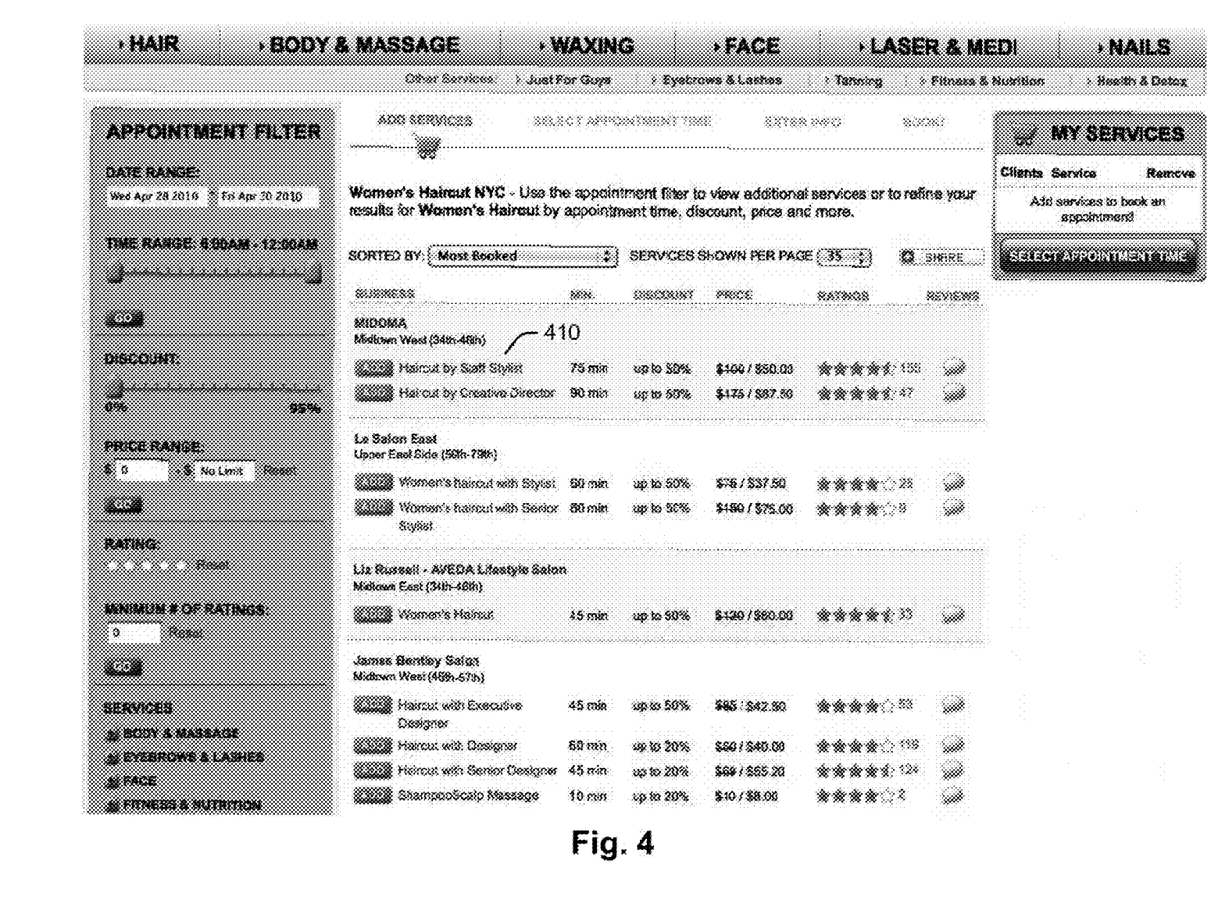
FIG. 4 illustrates one example embodiment of a service user interface.

FIG. 4 shows one example embodiment of the service user interface 135. Using this interface, service users 125 can search the online marketplace for available appointments using service type, appointment date/time range, service rating, business location, discount amount, and/or price range. The booking application 110 searches its database of available services and displays a listing of service providers and available appointments for services matching the user-specified search criteria. For example, in response to a user searching for providers of women's haircuts in New York on April 28 through April 30, the booking application 110 displays several New York salons, which provide the requested service on the given dates, as well as the pricing and discount information specified by the service provider 120. The user can view detailed information about the service provider and book an appointment with the service provider by clicking on the specific entries 410 in the displayed list.

Figure 5:
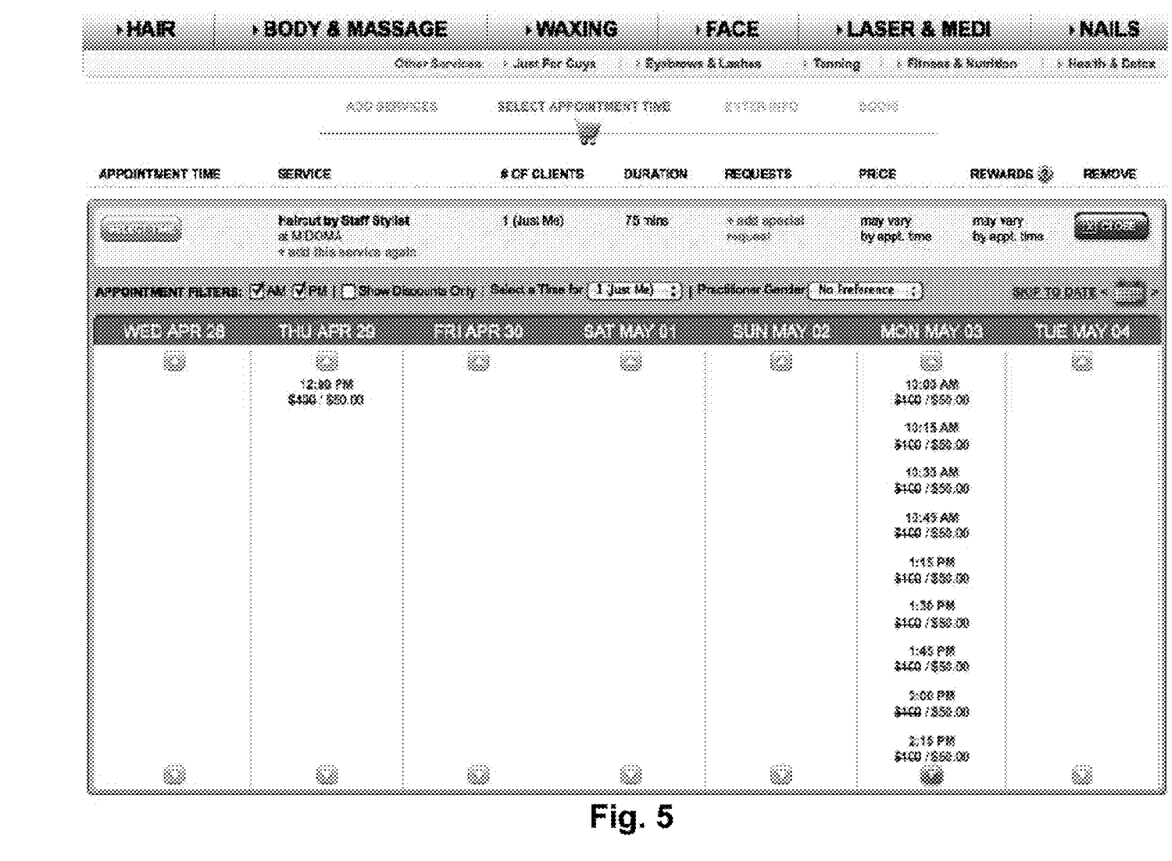
FIG. 5 illustrates one example embodiment of a calendar-based user interface.

FIG. 5 shows an example embodiment of a calendar-based user interface 135 for one of the service providers listed in the search results list in FIG. 4. The interface shows a weekly view of available appointments for the service provider and the associated pricing and discount information for each appointment. Monthly and daily views of the available appointments information are also available. In the case where additional practitioner-specific discount information has been specified by the service provider 120, this information may also be displayed, so that the user 125 can make appointment selection based on all available discount information. Once the user selects one of the available appointments, the service provider account is updated to reflect that an appointment has been booked, as shown, for example, by block 240 in FIG. 2, and an email message can be sent to the user 125 confirming this booking.

Figure 6:
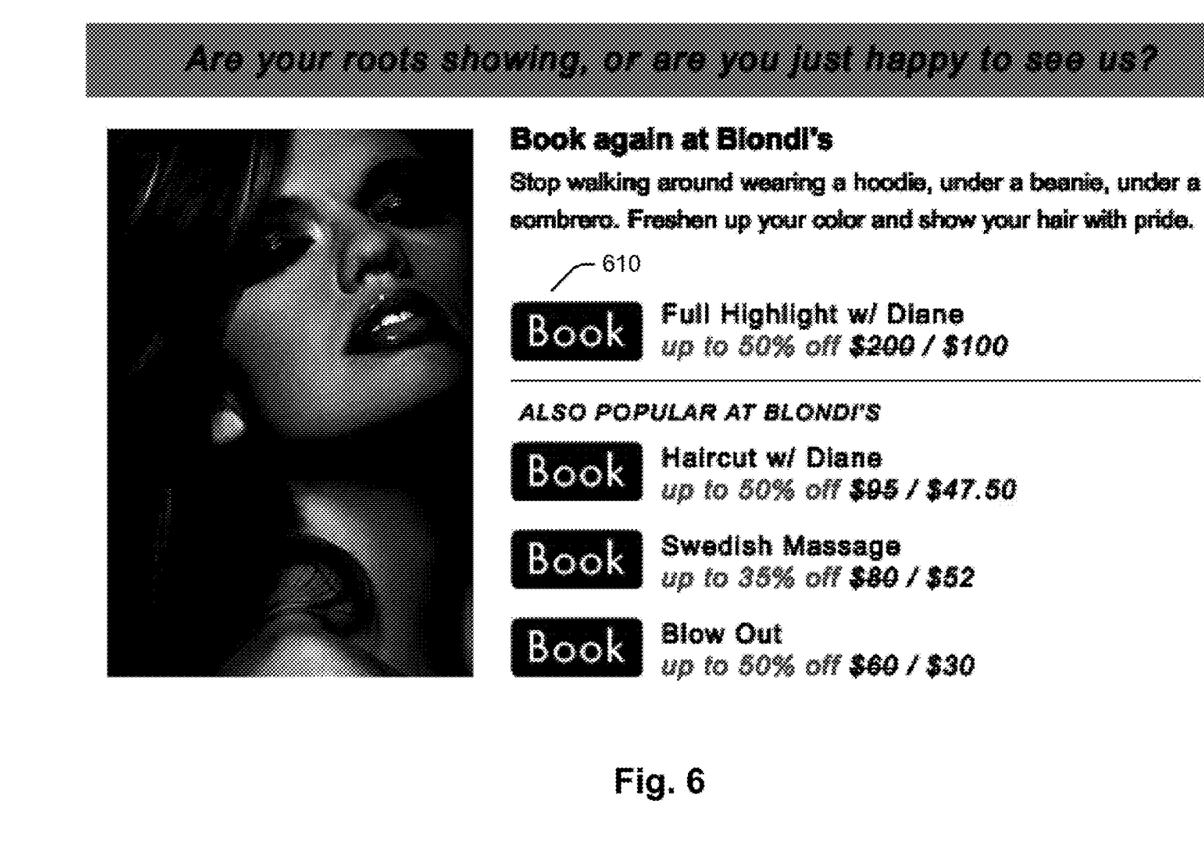
FIG. 6 illustrates one example embodiment of a targeted email.

In one example embodiment, the booking application 110 can dynamically create specific discount offers on services from the services inventory based on users' history of using different services, users' reviews and other criteria. For example, the application 110 may identify what users have booked before, looked at, indicated as being interested in, the number of times they returned to a particular business, and other criteria to determine what services should be advertised to the service users 125. The application 110 can then send targeted advertisements to service users 125 using emails, text messages (e.g., SMS), mobile applications, as well as other communication means. FIG. 6 shows one example of a targeted email that advertises discounted services to a service user 125 who previously booked services at Blondi's.

The targeted emails may be sent to the users on an interval based on the date of their last appointment according to service category (e.g., 3 months for a woman's haircut, 30 days for bikini waxing, etc.). The marketing copy and photos for reach advertisement may be the same for each service category, but the individual services/discounts are targeted to the unique user. When the user clicks "book" button 610, the service is added to her cart and she is shown a pop-up on the site asking if she would like to book now. When the user clicks book now, she goes to the appointment time selection page shown in FIG. 5 to select the desired appointment date/time.

Figure 7:
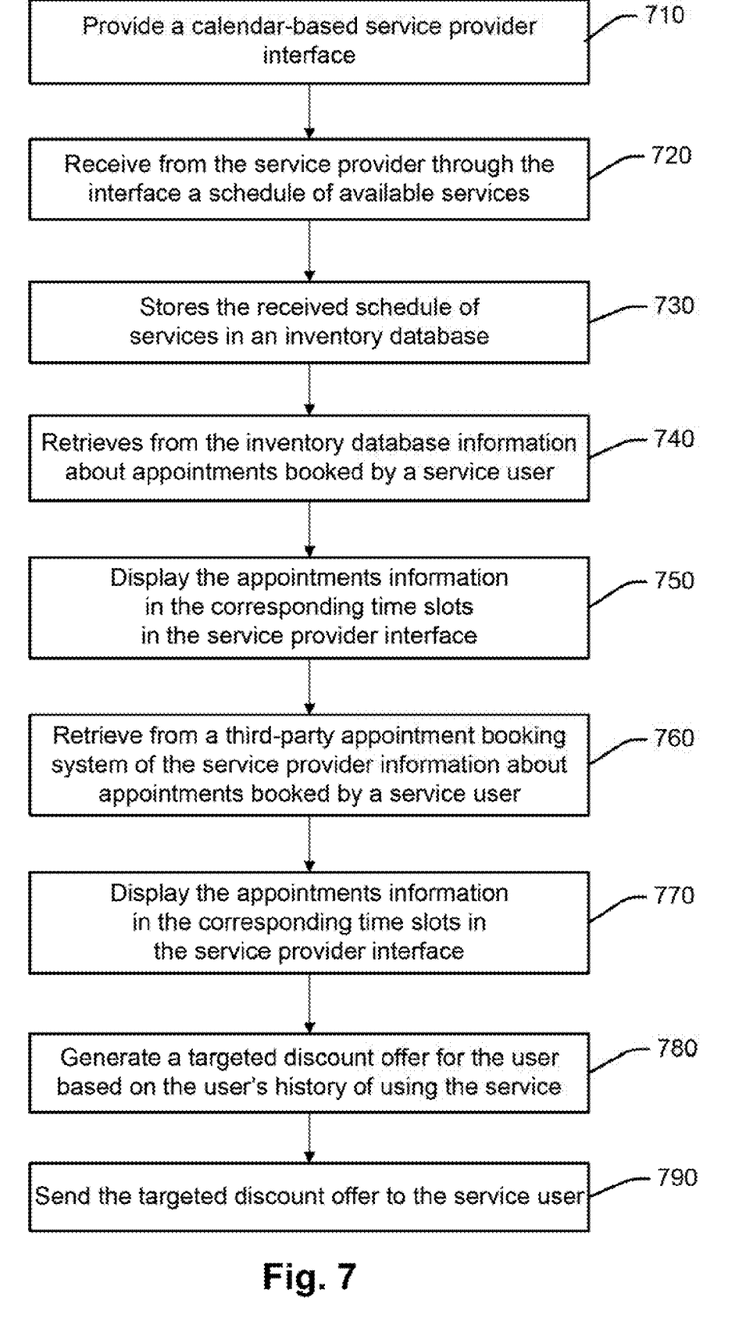
FIG. 7 illustrates one example embodiment of a method of operation of the online booking system.

FIG. 7 illustrates one example embodiment of a method of operation of the online booking application. At step 710, the application provides to a service provider a calendar-based service provider interface for creating a schedule of services provided by the service provider. At step 720, the service booking application receives from the service provider through the interface a schedule of available services, which includes the name of the service, the date and time when the service is provided, the name of the practitioner who performs the service, the price of the service and a discount offer. At step 730, the application stores the received schedule of services in an inventory database. At step 740, the application retrieves from the inventory database information about appointments booked by a service user with the service provider. At step 750, the application displays the appointment information in the corresponding time slots in the calendar-based service provider interface. At step 760, the application retrieves from a third-party appointment booking system of the service provider information about appointments booked by a service user. At step 770, the application displays the retrieved appointment information in the corresponding time slots in the calendar-based service provider interface. At step 780, the application generates a targeted discount offer for a service user based on for example, the user's history of using the service or other discount recommendation criteria specified by the service provider. At step 790, the application electronically sends, e.g., by e-mail, the targeted discount offer to the service user. The generated targeted discount offer may be published in other ways as well, for example through the interstitial ads, pop-up ads, mobile ads sent to the user's mobile phone, or other online publishing mechanisms known in the art.

Figure 8:
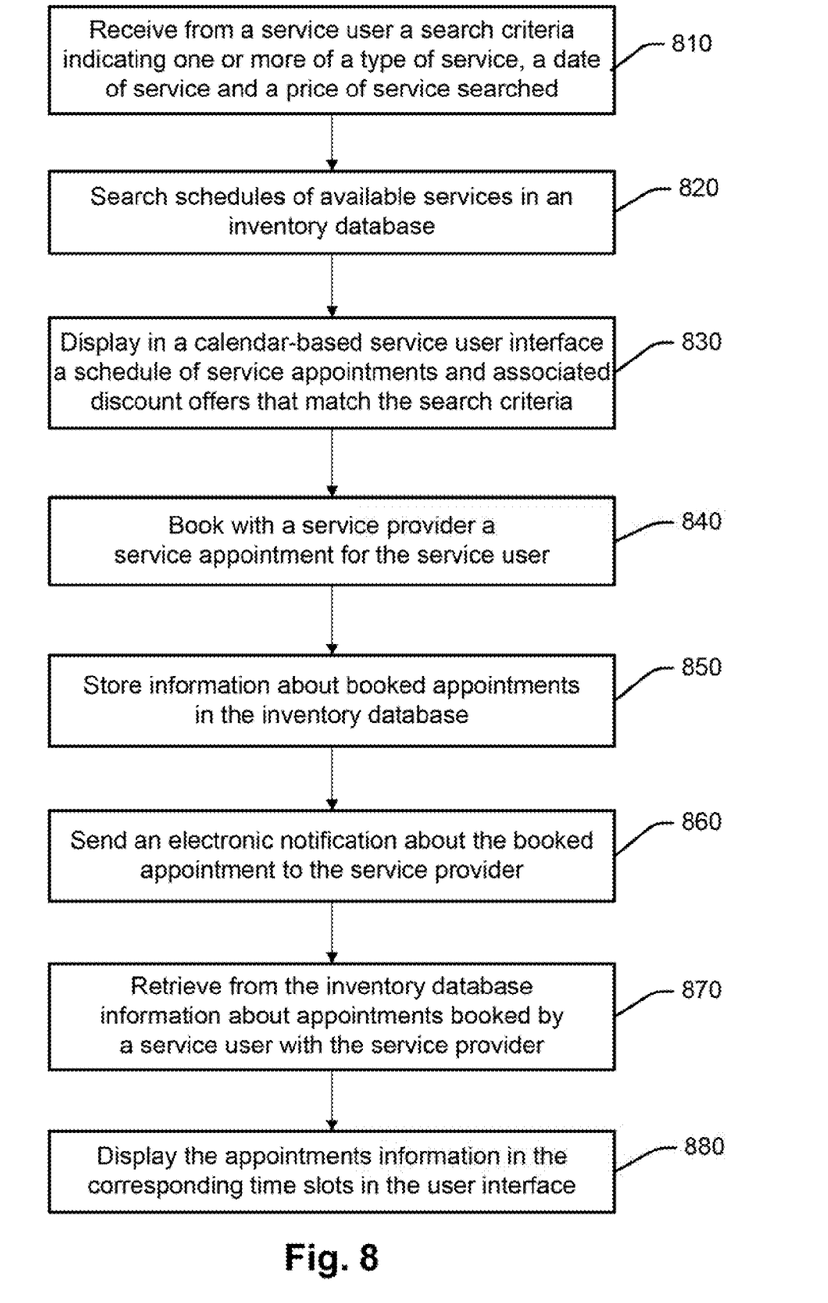
FIG. 8 illustrates another example embodiment of a method of operation of the online booking system.

FIG. 8 illustrates another example embodiment of a method of operation of the online booking application. At step 810, the application receives from a service user search criteria indicating one or more of a type of service, a date of service and a price of service searched by the service user. At step 820, the application searches schedules of available services in an inventory database. At step 830, the application displays in a calendar-based service user interface a schedule of available service appointments and associated discount offers that match the search criteria. At step 840, the application books with a service provider a service appointment for the service user. At step 850, the application stores information about booked appointments in the inventory database. At step 860, the application sends a notification about the booked appointment to the service provider and the user. At step 870, the application retrieves from the inventory database information about appointments booked by a service user with the service provider. At step 880, the application displays the appointments information in the corresponding time slots in the calendar-based service user interface.

Figure 9:
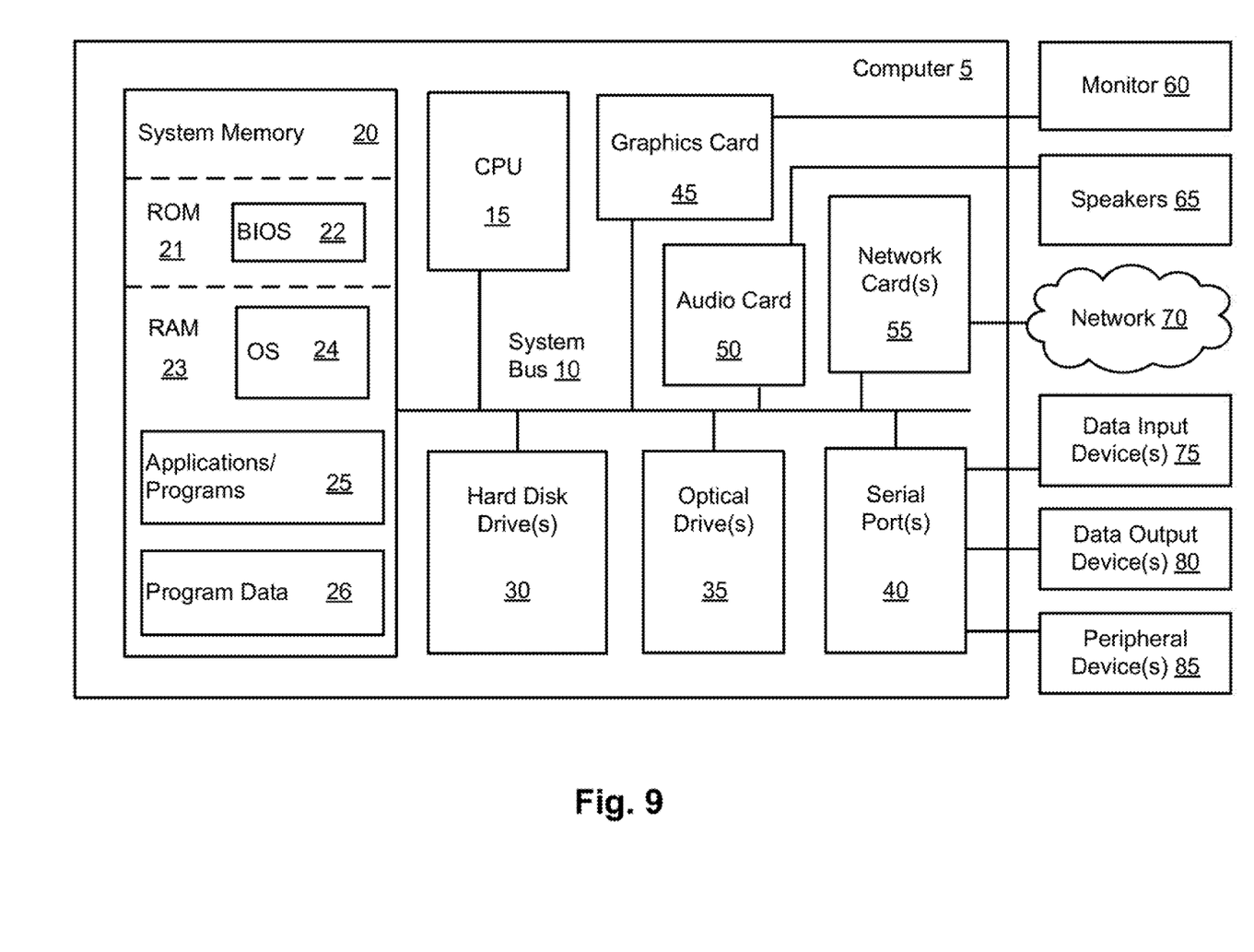
FIG. 9 illustrates one example embodiment of a computer system.

FIG. 9 depicts one example embodiment of a computer system 5, such as a personal computer or network server, suitable for implementing the applications server 105 that hosts the service booking application 110. As shown, computer system 5 may include one or more processors 15, memory 20, one or more hard disk drive(s) 30, optical drive(s) 35, serial port(s) 40, graphics card 45, audio card 50 and network card(s) 55 connected by system bus 10. System bus 10 may be any of several types of bus structures including a memory bus or memory controller, a peripheral bus and a local bus using any of a variety of known bus architectures. Processor 15 may include one or more Intel® Core 2 Quad 2.33 GHz processors or other type of microprocessor.

System memory 20 may include a read-only memory (ROM) 21 and random access memory (RAM) 23. Memory 20 may be implemented as in DRAM (dynamic RAM), EPROM, EEPROM, Flash or other type of, memory architecture. ROM 21 stores a basic input/output system 22 (BIOS), containing the basic routines that help to transfer information between the components of the computer system 5, such as during start-up. RAM 23 stores an operating system 24 (OS), such as Windows® XP Professional or other type of operating system, that is responsible for management and coordination of processes and allocation and sharing of hardware resources in computer system 5. System memory 20 also stores applications and programs 25, such as application 110. System memory 20 also stores various runtime data 26 used by programs 25.

Computer system 5 may further include hard disk drive(s) 30, such as SATA magnetic hard disk drive (HDD), and optical disk drive(s) 35 for reading from or writing to a removable optical disk, such as a CD-ROM, DVD-ROM or other optical media. Drives 30 and 35 and their associated computer-readable media provide non-volatile storage of computer readable instructions, data structures, applications and program modules/subroutines that implement algorithms and methods disclosed herein. Although the exemplary computer system 5 employs magnetic and optical disks, it should be appreciated by those skilled in the art that other types of computer readable media that can store data accessible by a computer system 5, such as magnetic cassettes, flash memory cards, digital video disks, RAMs, ROMs, EPROMs and other types of memory may also be used in alternative embodiments of the computer system.

Computer system 5 further includes a plurality of serial ports 40, such as Universal Serial Bus (USB), for connecting data input device(s) 75, such as keyboard, mouse, touch pad and other. Serial ports 40 may be also be used to connect data output device(s) 80, such as printer, scanner and other, as well as other peripheral device(s) 85, such as external data storage devices and the like. System 5 may also include graphics card 45, such as nVidia® GeForce® GT 240M or other video card, for interfacing with a monitor 60 or other video reproduction device. System 5 may also include an audio card 50 for reproducing sound via internal or external speakers 65. In addition, system 5 may include network card(s) 55, such as Ethernet, WiFi, GSM, Bluetooth or other wired, wireless, or cellular network interface for connecting the computer system 5 to a network 70, such as the Internet.

In various embodiments, the algorithms and methods described herein may be implemented in hardware, software, firmware, or any combination thereof. If implemented in software, the functions may be stored as one or more instructions or code on a non-transitory computer-readable medium. Computer-readable medium includes both computer storage and communication medium that facilitates transfer of a computer program from one place to another. A storage medium may be any available media that can be accessed by a computer. By way of example, and not limitation, such computer-readable medium can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies, such as infrared, radio, and microwave, are included in the definition of the medium.

In the interest of clarity, not all of the routine features of the embodiments are shown and described herein. It will be appreciated that in the development of any such actual implementation, numerous implementation-specific decisions must be made in order to achieve the developer's specific goals, and that these specific goals will vary from one implementation to another and from one developer to another. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of limitation, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various embodiments disclosed herein encompass present and future known equivalents to the known components referred to herein by way of illustration. Moreover, while embodiments and applications have been shown and described, it would be apparent to those skilled in the art having the benefit of this disclosure that many more modifications than mentioned above are possible without departing from the inventive concepts disclosed herein.

What is claimed is:

1. A computer-implemented method for scheduling and booking of service appointments, the method comprising:
   receiving through a calendar-based service provider interface, provided by a server, a schedule of services offered by a service provider by appointment, wherein the schedule includes at least one service offer identifying a type of service, a practitioner, a price of the service, and one or more rules set by the service provider;
   determining a discount amount to be applied to the price of the service in at least one service offer based on the one or more rules set by the service provider, wherein the discount amount of the price varies based on a time schedule and on an initial discount amount selected by the service provider for at least one practitioner or at least one type of service of the service provider, and wherein the service offer is further determined based on user behavioral data and users' reviews provided by the server;

storing the received schedule of services in an inventory database on the server;

accessing using a dedicated application program interface (API), a calendaring application of the service provider;

retrieving from the calendaring application of the service provider through the API information about available appointment dates and times for the schedule of services offered by the service provider;

storing the retrieved information about the available appointment dates and times in the schedule of services for the service provider in the inventory database;

generating the service offer for at least one user based on the available appointment dates and times for the services offered by the service provider;

automatically adjusting the discount amount of the generated service offer based on the one or more rules set by the service provider and the initial discount amount; and during each adjustment of the service offer,
identifying a user for receiving advertisements of the service offer, wherein identifying is based on at least one of the user having: viewed a previous service; booked a previous service; indicated an interest in a service; or returned to a particular business of a service provider a number of times;

generating a targeted discount offer for the service offer based on the adjusted discount amount;

electronically sending an advertisement with the targeted discount offer to the user; and sending to the service provider, through the API, information about which of the available appointment dates and times from the schedule of services have been booked by user.

2. The method of claim 1, wherein automatically adjusting the service offer further includes:
automatically decreasing or increasing the price of the service by a predetermined monetary amount in predetermined time increments based on the one or more rules set by the service provider.

3. The method of claim 1, wherein the service offer further includes an additional discount offer for a specified service practitioner who is available to perform the service.

4. The method of claim 1, wherein the service offer further includes an additional discount offer for a specified range of dates when the service is available to be performed.

5. The method of claim 1, wherein the service offer further includes an additional discount offer for a specified time range when the service is available to be performed.

6. The method of claim 1, further comprising:
receiving from a user a search criteria indicating one or more of a type of the service, a date of the service, a discount of the service, and a price of the service searched by the user;

identifying in the inventory database one or more available service offers that correspond to the type, the date and the price of the service searched by the user, wherein the corresponding price of the service includes a discounted price based on the adjusted discount amount for the date or time of the available service offer;

displaying in a web-based user calendar interface a schedule of available service offers that match the search criteria; and booking with a service provider a service appointment for the user based on the one or more available service offers.

7. A computer-implemented system for scheduling and booking of service appointments, the system comprising:
an inventory database for storing a schedule of booked and available service offers associated with a plurality of service providers; and a processor coupled to the database, the processor being configured to:

receive through a calendar-based service provider interface a schedule of services offered by the service provider by appointment, wherein the schedule includes at least one service offer identifying a type of service, a practitioner, a price of the service, and one or more rules set by the service provider;

determine a discount amount to be applied to the price of the service in at least one service offer based on the one or more rules set by the service provider, wherein the discount amount of the price varies based on a time schedule and on an initial discount amount selected by the service provider for at least one practitioner or at least one type of service of the service provider, and wherein the service offer is further determined based on user behavioral data and users' reviews provided by the server;

store the received schedule of services in the inventory database;

access using a dedicated application program interface (API), a calendaring application of the service provider;

retrieving from the calendaring application of the service provider through the API information about available appointment dates and times for the schedule of services offered by the service provider;

store the retrieved information about the available appointment dates and times in the schedule of services for the service provider in the inventory database;

generate the service offer for the at least one user based on the available appointment dates and times for the services offered by the service provider;

automatically adjust the discount amount of the generated service offer based on the one or more rules set by the service provider and the initial discount amount; and during each adjustment of the service offer,
identify a user for receiving advertisements of the service offer, wherein identifying is based on at least one of the user having: viewed a previous service; booked a previous service; indicated an interest in a service; or returned to a particular business of a service provider a number of times;

generate a targeted discount offer for the service offer based on the adjusted discount amount;

electronically send an advertisement with the targeted discount offer to the user; and send to the service provider, through the API, information about which of the available appointment dates and times from the schedule of services have been booked by user.

8. The system of claim 7, wherein to automatically adjust the service offer, the processor being further configured to:
automatically decrease or increase the price of the service by a predetermined monetary amount in predetermined time increments based on the one or more rules set by the service provider.

9. The system of claim 7, wherein the service offer further includes an additional discount offer for a specified service practitioner who is available to perform the service.

10. The system of claim 7, wherein the the service offer further includes an additional discount offer for a specified range of dates when the service is available to be performed.

11. The system of claim 7, wherein the service offer further includes an additional discount offer for a specified time range when the service is available to be performed.

12. The system of claim 7, wherein the processor further configured to:
- receive from a user a search criteria indicating one or more of a type of the service, a date of the service, a discount of the service, and a price of the service searched by the user;
- identify in the inventory database one or more available service offers that correspond to the type, the date and the price of the service searched by the user, wherein the corresponding price of the service includes a discounted price based on the adjusted discount amount for the date or time of the available service offer;
- display in a web-based user calendar interface a schedule of available service offers that match the search criteria; and
- book with a service provider a service appointment for the user based on the one or more available service offers.

13. A computer program product embedded in a non-transitory computer-readable storage medium, the medium comprising program instructions for scheduling and booking service appointments, the medium comprising instructions for:
- receiving through a calendar-based service provider interface, provided by a server, a schedule of services offered by a service provider by appointment, wherein the schedule includes at least one service offer identifying a type of the service, a practitioner, a price of the service, and one or more rules set by the service provider;
- determining a discount amount to be applied to the price of the service in at least one service offer based on the one or more rules set by the service provider, wherein the discount amount of the price varies based on a time schedule and on an initial discount amount selected by the service provider for at least one practitioner or at least one type of service of the service provider, and wherein the service offer is further determined based on user behavioral data and users' reviews provided by the server;
- storing the received schedule of services in an inventory database on the server;
- accessing using a dedicated application program interface (API), a calendaring application of the service provider;
- retrieving from the calendaring application of the service provider through the API information about available appointment dates and times for the schedule of services offered by the service provider;
- storing the retrieved information about the available appointment dates and times in the schedule of services for the service provider in the inventory database;
- generating the service offer for at least one user based on the available appointment dates and times for the services offered by the service provider;
- automatically adjusting the discount amount of the generated service offer based on the one or more rules set by the service provider and the initial discount amount; and
- during each adjustment of the service offer,
  - identifying a user for receiving advertisements of the service offer, wherein identifying is based on at least one of the user having: viewed a previous service; booked a previous service; indicated an interest in a service; or returned to a particular business of a service provider a number of times;
  - generating a targeted discount offer for the service offer based on the adjusted discount amount;
  - electronically sending an advertisement with the targeted discount offer to the user; and
- sending to the service provider, through the API, information about which of the available appointment dates and times from the schedule of services have been booked by user.

14. The product of claim 13, wherein instructions for automatically adjusting the service offer further include instructions for:
- automatically decreasing or increasing the price of the service by a predetermined monetary amount in predetermined time increments based on the one or more rules set by the service provider.

15. The product of claim 13, wherein the service offer further includes an additional discount offer for a specified service practitioner who is available to perform the service.

16. The product of claim 13, wherein the service offer further includes an additional discount offer for a specified range of dates when the service is available to be performed.

17. The product of claim 13, wherein the service offer further includes an additional discount offer for a specified time range when the service is available to be performed.

18. The product of claim 13, further comprising instructions for:
- receiving from a user a search criteria indicating one or more of a type of the service, a date of the service, a discount of the service, and a price of the service searched by the user;
- identifying in the inventory database one or more available service offers that correspond to the type, the date and the price of the service searched by the user, wherein the corresponding price of the service includes a discounted price based on the adjusted discount amount for the date or time of the available service offer;
- displaying in a web-based user calendar interface a schedule of available service offers that match the search criteria; and
- booking with a service provider a service appointment for the user based on the one or more available service offers.

* * * * *